(12) United States Patent
Pedersen

(10) Patent No.: US 8,255,702 B1
(45) Date of Patent: Aug. 28, 2012

(54) PROGRAMMABLE LOGIC DEVICE WITH IMPROVED SECURITY

(75) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 354 days.

(21) Appl. No.: 12/630,629

(22) Filed: Dec. 3, 2009

(51) Int. Cl.
*G06F 21/00* (2006.01)

(52) U.S. Cl. .................. 713/189; 713/193; 713/194

(58) Field of Classification Search ............... None
See application file for complete search history.

(56) References Cited

U.S. PATENT DOCUMENTS

| | | | |
|---|---|---|---|
| 4,885,778 A * | 12/1989 | Weiss | 713/184 |
| 4,933,898 A * | 6/1990 | Gilberg et al. | 365/53 |
| 5,001,756 A * | 3/1991 | Mayginnes et al. | 380/273 |
| 5,384,499 A | 1/1995 | Pedersen et al. | |
| 5,404,402 A * | 4/1995 | Sprunk | 713/189 |
| 5,883,956 A * | 3/1999 | Le et al. | 713/170 |
| 6,066,960 A | 5/2000 | Pedersen | |
| 6,115,312 A | 9/2000 | Jefferson et al. | |
| 6,255,846 B1 | 7/2001 | Lee et al. | |
| 6,480,028 B2 | 11/2002 | Jefferson et al. | |
| 6,831,959 B1 * | 12/2004 | Manchester | 375/354 |
| 6,927,601 B1 | 8/2005 | Lin et al. | |
| 6,989,689 B2 | 1/2006 | Ngai et al. | |
| 7,030,650 B1 | 4/2006 | Kaptanoglu et al. | |
| 7,123,052 B2 | 10/2006 | Schleicher et al. | |
| 7,161,384 B1 | 1/2007 | Lin et al. | |
| 7,205,791 B1 | 4/2007 | Lee et al. | |
| 7,317,332 B2 | 1/2008 | Ngai et al. | |
| 7,345,506 B1 | 3/2008 | Pederson | |
| 7,492,188 B2 | 2/2009 | Ngai et al. | |
| 7,545,896 B2 * | 6/2009 | Hutson | 375/354 |
| 7,573,297 B1 | 8/2009 | Lin et al. | |
| 7,685,434 B2 * | 3/2010 | Kaniz et al. | 713/189 |
| 7,889,866 B2 * | 2/2011 | Masugi et al. | 380/252 |
| 2005/0280455 A1 * | 12/2005 | Hutson | 327/156 |
| 2008/0022146 A1 * | 1/2008 | Kocher et al. | 713/600 |

* cited by examiner

*Primary Examiner* — Ponnoreay Pich

(74) *Attorney, Agent, or Firm* — Weaver, Austin, Villeneuve & Sampson, LLP

(57) ABSTRACT

Techniques of the present invention impede power consumption measurements of an encryption engine on a logic device by running the encryption engine with an independent clock. This clock produces a signal that is decoupled from and asynchronous to clock signals feeding other circuits on the device. The clock feeding the encryption engine is not accessible externally to the device. Circuits may be employed to intentionally slow down or add jitter to one or more of the clock signals.

20 Claims, 5 Drawing Sheets

US 8,255,702 B1

PROGRAMMABLE LOGIC DEVICE WITH IMPROVED SECURITY

FIELD OF THE INVENTION

The present disclosure generally relates to logic devices, and more particularly to encryption circuits on logic devices.

BACKGROUND

Power consumption may reveal clues about values such as encryption keys held in digital circuits. Fluctuations in current draw on the power rails feeding such circuits are measured as the circuit performs cryptographic operations. Power draw can correlate with the values of the key in unprotected systems. In one example, a single bit may determine whether or not a complex multiplication step is performed, affecting the power draw of the circuit. These fluctuations can be analyzed to recover the key. Existing approaches to protecting circuits from power analysis attacks include evening out the power draw, performing unnecessary operations, or adding random noise. However, these approaches are expensive in terms of power consumption and/or circuitry, sometimes tripling the size of the encryption circuits.

OVERVIEW

Techniques of the present invention counter power consumption measurements by running an encryption engine on a logic device with an independent clock. This clock produces a signal that is decoupled from and asynchronous to clock signals feeding other circuits on the device. The clock feeding the encryption engine is not accessible externally to the device. In some embodiments, the encryption engine clock runs at a faster rate than any other clock signals on the device.

To facilitate moving data across the different clock domains, some embodiments buffer data between the encryption engine and the rest of the device. The encryption engine may stall for certain amount of time if data is not ready. In one embodiment, this stall time is a random number of cycles. The encryption engine may continue to decode random inputs during a stall to generate additional noise.

According to certain embodiments, the clock feeding the encryption engine is also asynchronous with any other internal clock used to configure the device. These other internal clocks are also asynchronous with any externally visible clock or data signal and designed to run faster.

These and other features of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION

Figure 1:
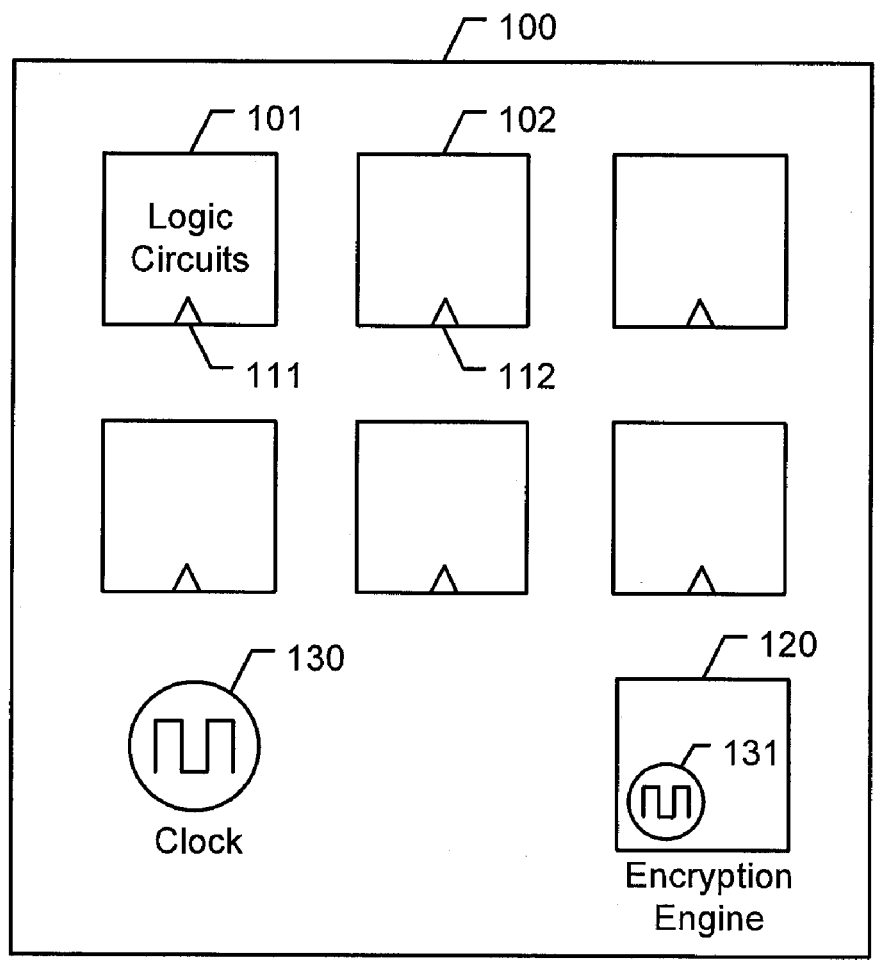
FIG. 1 is a block diagram of a programmable logic device according to an embodiment of the invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the apparatus and techniques of the present invention will be described in the context of a field-programmable gate array (FPGA). However, it should be noted that the techniques of the present invention can be applied to other types of circuits. In the following description, numerous specific details are set forth in order to provide a thorough understanding of the present invention. The present invention may be practiced without some or all of these specific details. In other instances, well known process operations have not been described in detail in order not to unnecessarily obscure the present invention. For instance, the terms encryption and decryption are used throughout this disclosure for clarity depending on context. However, aspects of the invention are not limited to one or the other. Techniques of the invention may be applied to circuits performing either type of operation or any other cryptographic functions.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Logic devices use encryption for many purposes. For example, programmable device such as Field Programmable Gate Arrays (FPGAs) are typically configured with an external bitstream of configuration data. This data is clocked into the FPGA either passively by an externally provided clock or actively by an internally generated clock. To protect the intellectual property contained in this bitstream, the bitstream is often encrypted with a configuration key and then decrypted by the FPGA as the bitstream is loaded. The configuration key is programmed into the FPGA, typically using volatile or non-volatile fuses. The FPGA uses the configuration key with decryption circuits, such as the Advanced Encryption Standard (AES) block cipher, to decrypt the bitstream.

Circuits performing cryptographic functions are referred to as an encryption engine. By making detailed measurements of the power consumed by a device running an encryption engine, it may be possible to determine the value of a key contained therein. These methods may be facilitated if the phase relationship between the encryption engine and the device clock is known, as this would make it relatively easy to average many power traces together. Such techniques are well known as described in the relevant art.

Several techniques can counter these types of power measurements. One approach modifies the encryption engine using algorithmic masking techniques. These techniques incorporate random values into the encryption circuitry to randomize the operations performed. For instance, an expensive multiplication may be performed even when not required by the key bits, discarding the result when it is not needed. This evens out the circuit's power draw. Unfortunately, these techniques are expensive in terms of power and circuit size. Masking operations consume power without performing any useful work, reducing the chip's efficiency and generating excess heat. They can also add a considerable amount of circuitry overhead—sometimes tripling the size of the encryption engine.

Other approaches attempt to thwart power measurement by reducing the signal-to-noise ratio, either by reducing the noise generated by the encryption engine (such as by using dual-rail or return-to-zero logic) or by intentionally generating random noise in the device in an attempt to mask the power signature. However, these countermeasures can be overcome by taking a sufficient number of samples.

According to the invention, a clock feeding an encryption engine is decoupled from clocks running other circuits on a logic device such as an FPGA. The clock feeding the encryption engine is not accessible externally to the FPGA. In particular, the clock feeding the encryption engine is different from either the externally provided clock (in a passive-programming mode) or from the internally generated clock provided to the output (in the active-programming mode). According to various embodiments, the clock feeding the encryption engine runs asynchronously in relation to the externally visible clocks and data signals, and is designed to run at a faster data rate (on average) than any of these other clock signals. Since the different clocks may be running at different rates due to differences in serial or parallel bus sizes, the "data rate" is understood to mean the total bits flowing through the system, and not the rate at which the words flow through the system (in the prior art, all clocks on the device would be considered to have the same data rate).

To facilitate moving data across the different clock domains, some embodiments add a FIFO in front the data input to the encryption engine. If data is not ready for the encryption block, then the encryption engine may stall for certain amount of time. In one embodiment, this stall time is a random number of cycles, but less then the number of cycles it would take the FIFO to become full. In order to generate noise, the decryption unit may continue to decode random inputs during this stall period.

According to certain embodiments, the clock feeding the decryption unit is also asynchronous with any other internal clock used to configure the device (such as any shift register that shifts the decrypted data throughout the rest of the device). These other internal clocks are also asynchronous with any externally visible clock or data signal and designed to run slightly faster. The output of the encryption engine interfaces with the rest of the FPGA core through a second FIFO.

In some embodiments, the internal clock feeding the encryption engine has a high jitter component. This jitter can be generated by injecting analog or digital noise into the clock generator, or by randomly skipping all or part of a clock cycle.

In some embodiments, random noise is generated in the device, where the random noise source runs off of yet another asynchronous clock. For example, the noise source may be a pseudo-random function computed on encrypted data being read into the device and controlled by yet another asynchronous clock.

In certain embodiments, a technique is used to guarantee that all of the internal clocks used for configuration have faster data rates than the generated clock provided externally to the FPGA during active programming. In the preferred embodiment, this technique includes comparing multiple clock sources before configuration begins, and choosing the slowest clock source as the clock source for the externally visible configuration clock. This clock is then made marginally slower, such as by adding extra capacitance to the loop of the clock generator oscillator.

Because the internal clocks are asynchronous to any external signal, it is more difficult to sync an external digital scope to the power rail signals, particularly when the signal to noise ratio is small—as when noise sources generate sufficient noise. This makes it difficult or impossible to average multiple power-traces together in an attempt to filter out the noise.

FIG. 1 is a block diagram of a programmable logic device according to an embodiment of the invention. Device 100 may represent any type of logic device, such as a partially programmable integrated circuit, CPLD, or FPGA. The device includes some number of logic circuits such as circuits 101 and 102. Each logic circuit is fed by a clock signal, depicted as inputs 111 and 112 to circuits 101 and 102, respectively. The clock signal provides timing pulses that allow the circuits to operate. This signal is generated by a clock circuit 130. The clock circuit may reside on the logic device 100 as shown, or an external clock may provide the clock signal via an input pin to the device.

Device 100 also contains circuits configured as an encryption engine 120. The encryption engine performs cryptographic operations such as encryption or decryption using one or more secret values such as a key. The encryption engine runs off a second clock 131 instead of the main clock. The second clock signal is generated on the logic device and not provided externally. According to various embodiments, it may be derived from the main clock signal or generated independently. Regardless, the second clock signal runs asynchronous to the main clock signal. Having the two clock signals out of phase prevents an observer from timing the power consumption of the encryption engine and recovering a key stored therein.

For increased security, the second clock signal should not be observable outside the logic device. As mentioned, the second clock signal is not output by the logic device. However, an attacker with sophisticated circuit testing equipment may probe the device and attempt to tap the second clock signal. This would allow the attacker to observe the timings of the decryption engine and correlate them with power consumption. To prevent this, some embodiments ensure that the second clock signal is not provided on any parts of the logic device that can be tapped or otherwise observed externally. Such techniques are well known in the art depending on the type of logic device. For instance, on an FPGA device the encryption engine and second clock would be implemented within the same logic block, since the lines connecting logic blocks may be tapped.

Figure 2:
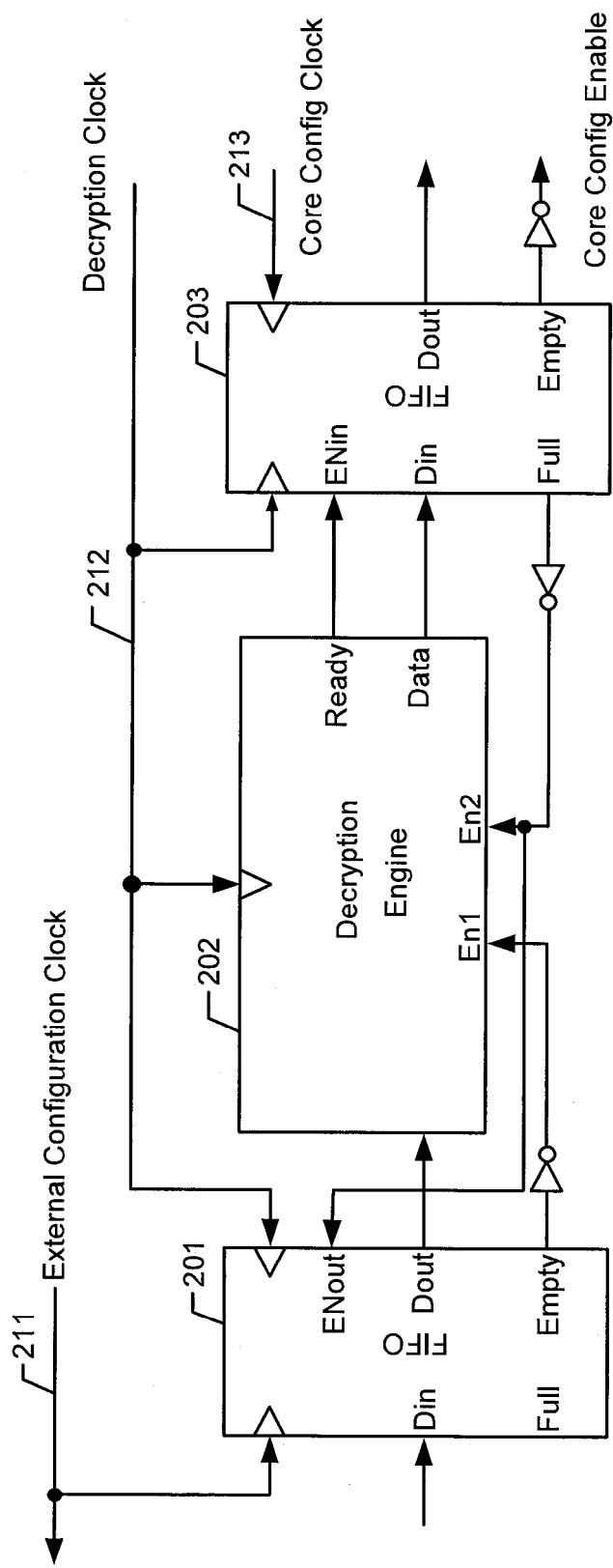
FIG. 2 depicts a logic block implementing an encryption engine and buffers driven by a separate clock.

FIG. 2 depicts a logic block implementing an encryption engine and buffers driven by a separate clock according to an embodiment of the invention. Shown are an input FIFO 201, a Decryption Engine 202, and an output FIFO 203. The input FIFO buffers data fed as input to the Decryption Engine, while the output FIFO buffers the Decryption Engine's output.

The FIFOs and Decryption Engine are fed by three different clock signals. These signals come from an External Configuration Clock 211, a Decryption Clock 212, and a Core Config Clock 213. These clocks run asynchronously with each other. The Decryption Clock and Core Config clock are designed to run faster than the fastest allowed External Configuration Clock. The External Configuration Clock is either generated internally on the FPGA and then provided externally via a pin, or the signal is provided by a source external to the FPGA. The External Configuration Clock is tied to the input side of the input FIFO so that the FIFO can receive data from other circuits on the device fed by the External Configuration Clock. For example, the data input to the input FIFO may be fed by the external configuration data stream. The data output side of the input FIFO feeds the encrypted data input to the Decryption Engine.

The Decryption Clock is tied to the output side of the input FIFO, the clock input of the Decryption Engine, and the input side of the output FIFO. This synchronizes the decryption engine with its input and output FIFO buffers so it may send and receive data with them. The data input to the output FIFO is fed by the decrypted data output from the Decryption Engine. The data output side of the output FIFO feeds other circuits on the FPGA, such as the core. The Core Config clock signal to the output FIFO allows it to communicate with these other circuits.

When the input FIFO is empty, or the output FIFO is full, the Decryption Engine pauses. When the output FIFO is full, the output-clock of the input FIFO is disabled (but writes into the input-side may still occur). When the EN2 signal to the Decryption Engine is asserted, and a decrypted block of data is available, the Decryption Engine asserts its Ready output and the output Data of the Encryption Engine is transferred into the output FIFO.

Figure 3:
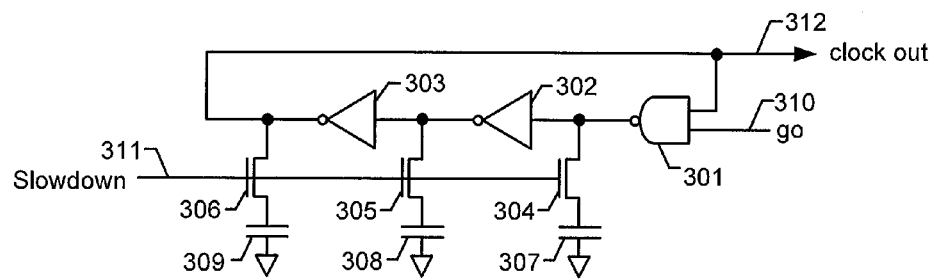
FIG. 3 shows a clock generator that can slow down the clock signal output.

FIG. 3 shows an example of a clock generator that slows down the clock signal output. A clock signal 312 is generated by turning on the "go" input 310. When slowdown signal 311 is off, the circuit creates a simple clock. NAND gate 301 outputs a one when go is enabled, since the second input to NAND 301 is initially off. After passing through two NOT gates 302-303, signal 312 outputs a one. Signal 312 is also fed back into NAND 301. With go still enabled, the NAND gate now outputs a zero, since both its inputs are ones. The zero is output by clock signal 312. The zero is also fed back into NAND gate 301, which outputs one again. In this way, the signal oscillates between zero and one, forming a clock. The clock stops when the go signal is turned off.

The clock signal 312 can be marginally slowed down by asserting a "slowdown" input 311 to the clock generator that adds capacitive loading to the clock path. When the slowdown signal 311 is asserted, gates 304-306 are closed. The signal out of NAND gate 301 passes through gate 304 to capacitor 307. When the capacitor is saturated, current proceeds through NOT gate 302. With gate 305 closed, capacitor 308 absorbs current until it becomes saturated. The signal then proceeds through NOT 303 and gate 306 to capacitor 309. Once capacitor 309 is charged, the signal proceeds to clock output 312. Thus the clock signal is delayed through the circuit for the time it takes to charge capacitors 307-309. These types' of circuits are useful for practicing certain embodiments of the invention, as described with regard to FIG. 5.

Figure 4:
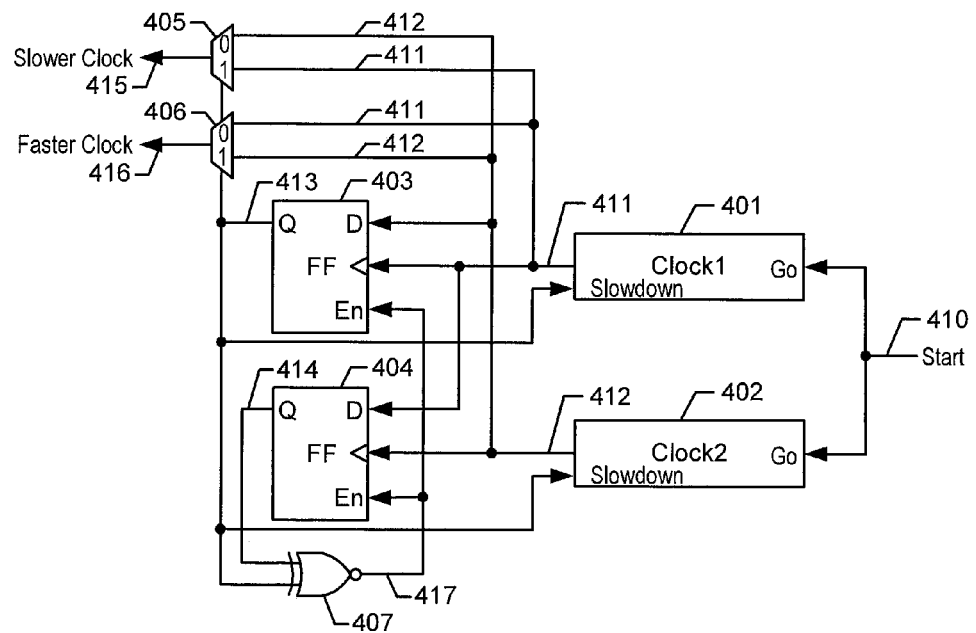
FIG. 4 shows circuitry for automatically choosing the slower of two clock signals.

FIG. 4 shows example circuitry for automatically choosing the slower of two clock signals. Both clocks are started at the same time, and if the rising edge of one clock precedes the rising edge of the other clock, the first clock is chosen as the faster of the two clocks. Once the two flip-flops have resolved to either the 0-1 or 1-0 state, the output of the XOR gate becomes ground (GND) and disables any further changes in the flip-flops. The slower clock is then routed to the output of the first clock multiplexer (mux) and the faster clock is routed to the output of the second clock mux. This also causes the "slowdown" input to the slower clock generator to be asserted. Techniques such as this are useful for practicing certain embodiments of the invention, as described with regard to FIG. 5.

The depicted circuit operates as follows. Clocks 401 and 402 may be any circuitry for generating a clock signal, including the clock of FIG. 3. Clock 401 outputs clock signal 411 while clock 402 outputs clock signal 412. Clock signal 411 is used as the clock input to flip-flop 403 and the data input to flip-flop 404. Similarly, clock signal 412 provides the clock input to flip-flop 404 and the data input to flip-flop 403. The "enable" input to flip-flops 403 and 404 is initially asserted, and the two flip flops will load the data on their respective 'ID' inputs on a rising edge of their respective clocks. Output signal 413 presents the last data that was stored into the enabled flip-flop 403 by a rising clock edge, and likewise for flip-flop 404 and output signal 414. XNOR gate 407, which generates the enable signal, outputs a logical "1" when the both outputs 413 and 414 have the same value (either both "1" or both "0"). Thus the enable signal will be asserted while the two flip-flops output the same value.

On the rising edge of clock 402, the value on the output 411 of clock 401 will be stored into flip-flop 404. If clock 402 is faster than clock 401, this value will be a "0", while if clock 402 is slower than clock 401, this value will be a "1". If the rising clock edges from clocks 401 and 402 happen at the same time, the value stored in flip-flop 404 may be a "0" or a "1". Likewise, on the rising edge of clock 401, the value of the output 412 of clock 402 will be stored into flip-flop 403. If clock 401 is faster than clock 402, this value will be a "0", while if clock 401 is slower than clock 402, this value will be a "1". If the rising clock edges happen at the same time, the value may be "0" or a "1".

Thus, if the output 413 of flip-flop 403 becomes "0" and the output of 414 of flip-flop 404 becomes a 1, this indicates that clock 401 is faster than clock 402. Conversely, if the output 414 of flip-flop 404 becomes a "1" and the output of "414" becomes a "0", this indicates that clock 402 is faster than clock 401. In either case, the output of XNOR gate 407 will become deasserted, and flip-flops 403 and 404 will thereafter maintain their complementary values on outputs 413 and 414, respectively. When this occurs, output 413 will be asserted if Clock 401 is slower than clock 402. Asserting output 413 activates the "slowdown" input of clock 401 to slow it down further. Similarly, output 414 will be asserted if Clock 402 is slower than clock 401, activating the "slowdown" input of clock 402 to slow it down further.

If outputs 413 and 414 are the same, then which clock is faster is indeterminate. In this case, the XNOR gate 407 will output a "1", and continue to assert the enable input to flip-flops 403 and 404. In turn, flip-flops 403 and 404 will continue to trigger with each rising edge of clock 401 and clock 402 respectively until outputs 413 and 414 eventually differ.

Output signal 413 is tied to two multiplexers (muxes) 405 and 406. When signal 413 is asserted, mux 405 outputs signal 411 from clock 401 and mux 406 outputs signal 412 from clock 402. If clock 401 is faster, signal 413 will be off. Mux 405 will select signal 412 from the slower clock 402, while mux 406 selects signal 411 from faster clock 401. Similarly, if clock 402 is faster, signal 413 will be on. Mux 405 will select signal 411 from slower clock 1 while mux 406 selects signal 412 from faster clock 402. Hence in either case, mux 406 outputs the faster clock and mux 405 outputs the slower clock. Thus the depicted circuit picks which of two clocks produces the slower signal.

Figure 5:
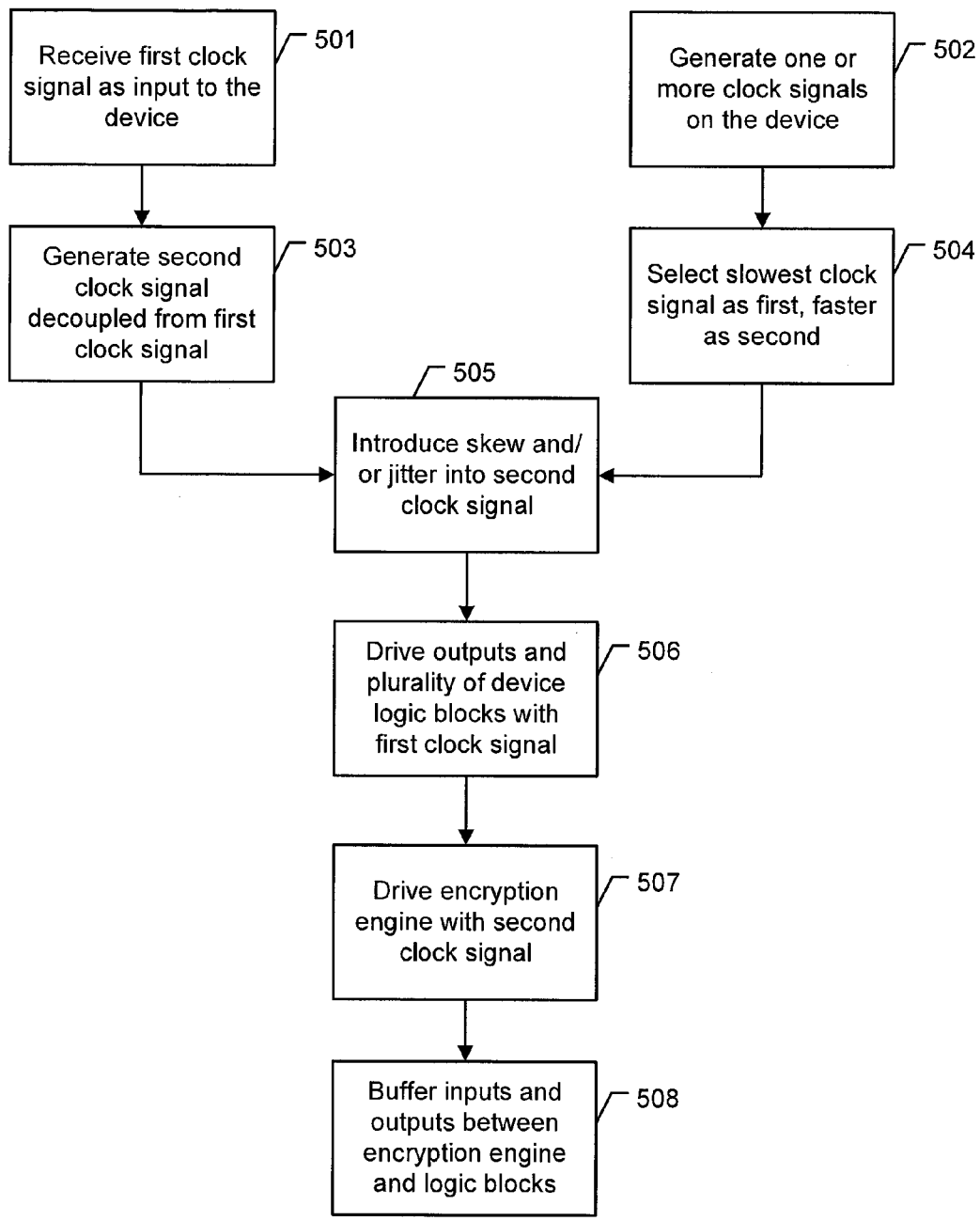
FIG. 5 is a flowchart embodying various techniques of practicing the invention.

FIG. 5 is a flowchart embodying various techniques of practicing the invention. In one embodiment, a logic device receives a first clock signal via an input from an external source 501. For example, some FPGAs provide an input pin for receiving a clock signal. The logic device generates a second clock signal internally which is decoupled from the first clock signal 503. Techniques for generating such clock signals are well known in the art.

In another embodiment, the logic device generates one or more clock signals internally 502. The slowest clock signal is selected as the first clock signal and a faster clock signal is selected as the second clock signal 504. This may be accomplished using the techniques of FIGS. 3 and 4, among other ways. For example, one clock signal may be fed into circuit 300 and slowed down sufficiently to ensure it is slower than the other clock signals. Alternatively, circuit 400 may be employed to select the slower of two clock signals. Many other techniques will be appreciated by those skilled in the art.

In either case, the second clock signal produced by 503 or 504 is preferably out of phase with the first clock signal so that the two signals can not be synched. For example, this can be achieved by generating the second clock signal randomly without regard to the first where the probability of the first and second signals being in phase is low. Alternatively, circuitry to guarantee the two clock signals are out of phase may be employed using well-known techniques.

Some embodiments introduce skew or jitter into the second clock signal 505. For example, jitter may be added from a random noise source. Similarly, skew may be added using a circuit such as circuit 300 in FIG. 3 to delay the clock signal. The slowdown signal to circuit 300 may be asserted periodically (including randomly) to introduce skew that is difficult for by an external observer of the device to compensate for.

The first clock signal is used to drive a plurality of logic blocks on the logic device 506. The plurality may include any blocks not implementing the encryption engine. In some embodiments, this may include every logic block on the device not used for the encryption engine. Outputs from the device may also be driven by the first clock signal.

The second clock signal is used to drive the encryption engine on the device 507. The second clock signal is not provided externally to the device. Preferably, the second clock signal is confined to the portion of the device implementing the encryption engine and associated circuits. This prevents an attacker from detecting the second clock signal by probing interconnects between device components such as logic blocks.

In some embodiments, inputs and outputs between the encryption engine and other components of the device are buffered 508. Buffering may be accomplished with circuitry such as a FIFO queue, as well as numerous other techniques known in the art. Such buffering may aid in transferring data across the clock domains. For example, when the second clock runs faster than the first clock, the encryption engine may process data faster than the other logic blocks can provide it. This can create stalls of the encryption engine as data starvation occurs. Buffers such as 201 and 203 between the clock domains can help alleviate these problems.

Figure 6:
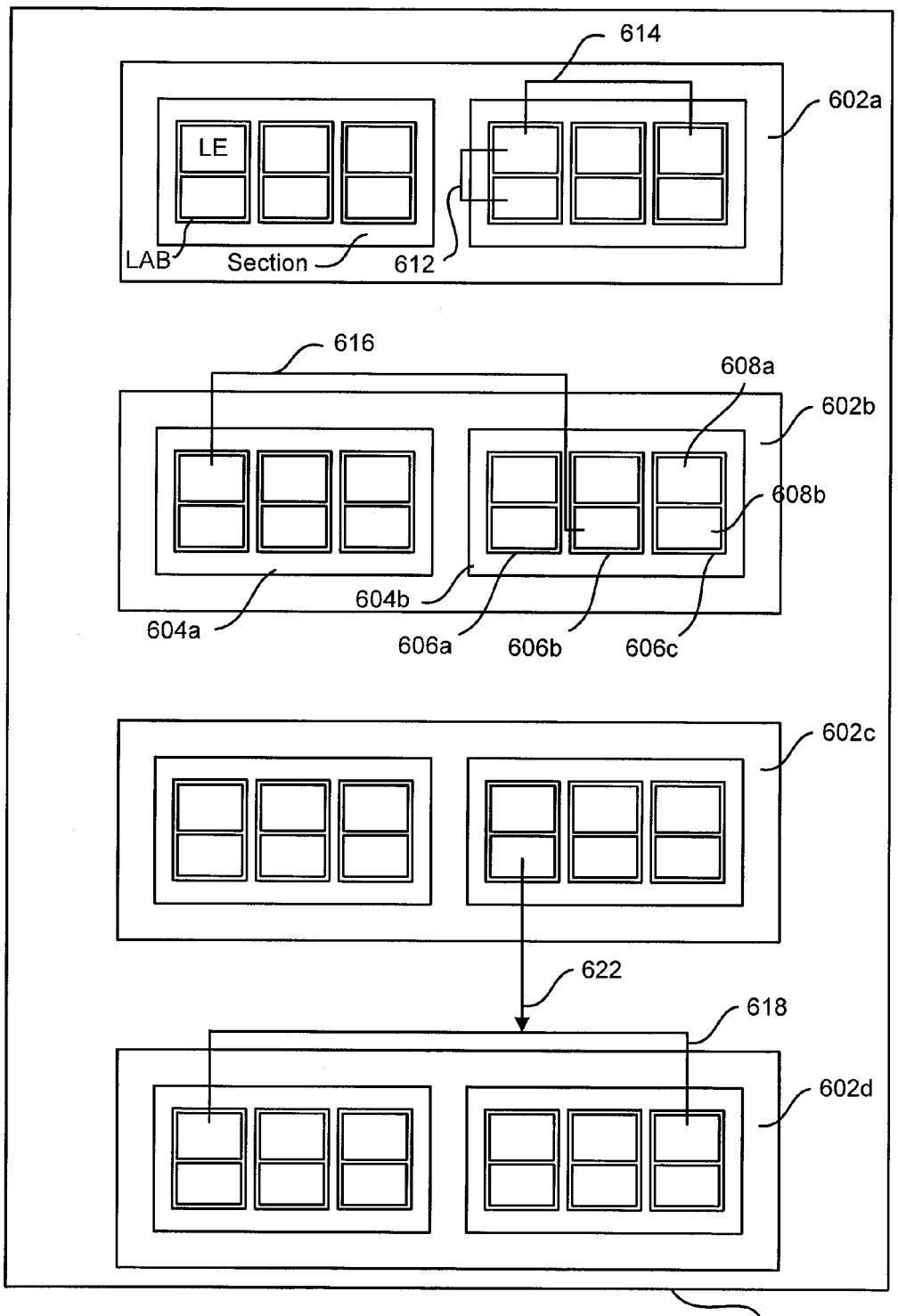
FIG. 6 is an idealized block representation of the architecture of an arbitrary hardware device which may be employed in accordance with this invention.

FIG. 6 is an idealized block representation of the architecture of certain types of hardware device which may be employed in accordance with this invention. For example, this idealized representation may represent portions of the layout of a Cyclone III or Stratix IV programmable logic device available from Altera Corporation of San Jose, Calif. In FIG. 6, a programmable logic device 600 is segmented into a plurality of "rows" to facilitate interconnection between logic elements on a given row. In the hypothetical example shown, there are four rows: 602a, 602b, 602c, and 602d.

Each row of programmable logic device 600 is further subdivided into two "half-rows." For example, row 602b is shown to contain a half-row 604a and a half-row 604b. The next lower level of the hierarchy is the "logic array block" (LAB). Half-row 604b, for example, contains three LABs: an LAB 606a, an LAB 606b, and an LAB 606c. Finally, at the base of the hierarchy are several logic elements. Each such logic element exists within a single logic array block. For example, LAB 606c includes two logic elements: a logic element 608a and a logic element 608b.

PLD 600 includes four hierarchical levels: (1) rows, (2) half-rows, (3) LABs, and (4) logic elements (LEs). Any logic element within PLD 600 can be uniquely specified (and located) by specifying a value for each of these four levels of the containment hierarchy. For example, logic element 608b can be specified as follows: row (2), half-row (2), LAB (3), LE (2). To fit a logic design onto a target hardware device such as that shown in FIG. 6, a synthesized netlist is divided into logic cells (typically containing one or more gates) which are placed in the various logic elements as uniquely defined above. Thus, each logic cell from the synthesized netlist resides in a unique single logic element. According to some embodiments of the invention, the logic configuration of the PLD is encrypted before loading onto device 600. An encryption engine on device 600 implemented with the techniques disclosed herein decrypts the configuration. The decrypted configuration can then be used to configure programmable logic elements on the device.

It should be understood that the present invention is not limited to the Altera Cyclone III or Stratix IV architecture or any other hardware architecture for that matter. In fact, it is not even limited to programmable logic devices. It may be employed generically in target hardware devices as broadly defined above and preferably in integrated circuit designs. PLDs are just one example of integrated circuits that can benefit from application of the present invention.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, although FPGAs are used in the various examples and figures, the present invention is not limited to an implementation involving an FPGA as the logic device. The present invention contemplates the use of other logic devices such as integrated circuits, ASICs, CPLDs, or processors. It is therefore intended that the invention be interpreted to include all variations and equivalents that fall within the true spirit and scope of the present invention.

What is claimed is:

1. A programmable logic device comprising:
 a plurality of logic elements driven by a first clock signal;
 a decryption core configured to process encrypted input data and generate plaintext output data, the decryption core driven by a second clock signal, wherein the second clock signal is an internal asynchronous clock signal undetectable from outside the programmable logic device;
 wherein the plaintext output data is generated to configure a plurality of logic blocks comprised of the plurality of logic elements on the programmable logic device, the plurality of logic blocks driven by the first clock signal.

2. The programmable logic device in accordance with claim 1, further comprising
 a first memory on the logic block to buffer input data to the encryption engine from the plurality of logic blocks; and
 a second memory on the logic block to buffer output data from the encryption engine to the plurality of logic blocks.

3. The programmable logic device in accordance with claim 2, wherein the encryption engine processes data from a source other than the first memory and discards the results if the first memory does not contain any input data.

4. The programmable logic device in accordance with claim 1, wherein the first clock signal is provided by an external device.

5. The programmable logic device in accordance with claim 1, further comprising circuitry to keep the second clock signal out of phase with the first clock signal.

6. The programmable logic device in accordance with claim 1, further comprising circuitry to compare a plurality of clock signals and select the slowest signal in the plurality as the first clock signal.

7. The programmable logic device in accordance with claim 1, further comprising a third clock signal asynchronous with the first and second clock signals, the third clock signal driving other logic components of the device.

8. The programmable logic device in accordance with claim 1, further comprising a jitter component which induces jitter in the second clock signal.

9. A method for encrypting data on a programmable logic device, comprising:
 driving a plurality of logic blocks on the device including output elements with a first clock signal;
 generating a second clock signal decoupled from the first clock signal in a logic block on the device, wherein the second clock signal is an internal asynchronous clock signal undetectable from outside the programmable logic device; and
 driving an encryption engine implemented on the logic block with the second clock signal, the encryption engine processing input data from the plurality of logic blocks and returning output data to the plurality of logic blocks.

10. The method in accordance with claim 9, further comprising
 buffering input data to the encryption engine from the plurality of logic blocks in a first memory on the logic block; and
 buffering output data from the encryption engine to the plurality of logic blocks in a second memory on the logic block.

11. The method in accordance with claim 10, wherein the encryption engine processes data from a source other than the first memory and discards the results if the first memory does not contain any input data.

12. The method in accordance with claim 9, wherein the first clock signal is provided by an external device.

13. The method in accordance with claim 9, further comprising keeping the second clock signal out of phase with the first clock signal.

14. The method in accordance with claim 9, further comprising comparing a plurality of clock signals and selecting the slowest signal in the plurality as the first clock signal.

15. The method in accordance with claim 9, further comprising generating a third clock signal asynchronous with the first and second clock signals, and driving other logic components of the device with the third clock signal.

16. The method in accordance with claim 9, further comprising inducing jitter in the second clock signal.

17. A non-transitory computer readable storage medium comprising instructions for configuring a logic device to
 drive a plurality of logic blocks on the device including output elements with a first clock signal;
 generate a second clock signal decoupled from the first clock signal in a logic block on the device, wherein the second clock signal is an internal asynchronous clock signal undetectable from outside the programmable logic device; and
 drive an encryption engine implemented on the logic block with the second clock signal, the encryption engine processing input data from the plurality of logic blocks and returning output data to the plurality of logic blocks.

18. The non-transitory computer readable storage medium in accordance with claim 17 wherein the instructions further configure the device to
 buffer input data to the encryption engine from the plurality of logic blocks in a first memory on the logic block; and
 buffer output data from the encryption engine to the plurality of logic blocks in a second memory on the logic block.

19. The non-transitory computer readable storage medium in accordance with claim 17 wherein the instructions further configure the device to keep the second clock signal out of phase with the first clock signal.

20. The non-transitory computer readable storage medium in accordance with claim 17 wherein the instructions further configure the device to compare a plurality of clock signals and select the slowest signal in the plurality as the first clock signal.

* * * * *